United States Patent
Lim et al.

(10) Patent No.: US 12,287,854 B2
(45) Date of Patent: Apr. 29, 2025

(54) METHOD AND SYSTEM FOR A SECURE TRANSACTION

(71) Applicant: QRYPTED TECHNOLOGY PTE LTD, Singapore (SG)

(72) Inventors: Meng Check Lim, Singapore (SG); Alvin Uy Carvajal, Minglanilla Cebu (PH); Rainier Ngie Ong, Quezon (PH); Bu Jeen Eric Toh, Selangor (MY)

(73) Assignee: QRYPTED TECHNOLOGY PTE LTD, Singapore (SG)

( * ) Notice: Subject to any disclaimer, the term of this patent is extended or adjusted under 35 U.S.C. 154(b) by 514 days.

(21) Appl. No.: 17/428,252

(22) PCT Filed: Feb. 14, 2020

(86) PCT No.: PCT/SG2020/050078
§ 371 (c)(1),
(2) Date: Aug. 3, 2021

(87) PCT Pub. No.: WO2020/190208
PCT Pub. Date: Sep. 24, 2020

(65) Prior Publication Data
US 2022/0138290 A1 May 5, 2022

(30) Foreign Application Priority Data
Mar. 18, 2019 (SG) .............. 10201902395S

(51) Int. Cl.
*G06F 21/31* (2013.01)
*G06F 21/45* (2013.01)
(Continued)

(52) U.S. Cl.
CPC .............. *G06F 21/31* (2013.01); *G06F 21/45* (2013.01); *G06F 21/6245* (2013.01); *H04L 9/0894* (2013.01); *H04L 9/3226* (2013.01)

(58) Field of Classification Search
CPC ...... G06F 21/31; G06F 21/45; G06F 21/6245; G06F 2221/2131; H04L 9/0894;
(Continued)

(56) References Cited

U.S. PATENT DOCUMENTS 5,734,718 A * 3/1998 Prafullchandra ....... G06F 21/31
713/183
5,751,812 A * 5/1998 Anderson ............... G06F 21/31
726/5

(Continued)

FOREIGN PATENT DOCUMENTS

CN 201025713 Y 2/2008
JP 2016192715 A * 11/2016
WO WO-2018048851 A1 * 3/2018 ........... G06F 21/316

OTHER PUBLICATIONS

International Search Report and Written Opinion of the International Searching Authority for International Application No. PCT/SG2020/050078, mailed Mar. 4, 2020.

Primary Examiner — John B King
(74) Attorney, Agent, or Firm — MARSHALL, GERSTEIN & BORUN LLP

(57) ABSTRACT

The present invention herein relates to method and system for authenticating user, protecting user data, and resetting security code. One of the advantages of the present invention is the protection of data in transit to ensure a secure user authentication and user data protection both in transit and at rest. Another advantage of the present invention is through a new security code resetting method, user can be verified without the need of storing the user verification data in the platform.

16 Claims, 20 Drawing Sheets

(51) Int. Cl.
  *G06F 21/62* (2013.01)
  *H04L 9/08* (2006.01)
  *H04L 9/32* (2006.01)

(58) Field of Classification Search
  CPC ... H04L 9/3226; H04L 9/088; H04L 63/0428; H04L 63/08; H04L 63/083
  See application file for complete search history.

(56) References Cited

U.S. PATENT DOCUMENTS

| | | | | |
|---|---|---|---|---|
| 5,915,025 | A * | 6/1999 | Taguchi | G06F 12/145 380/46 |
| 6,738,907 | B1 * | 5/2004 | Carter | H04L 9/08 380/283 |
| 8,447,990 | B2 | 5/2013 | Utin | |
| 9,292,674 | B2 | 3/2016 | Utin | |
| 2001/0044893 | A1 * | 11/2001 | Skemer | H04L 12/2856 713/153 |
| 2002/0071566 | A1 | 6/2002 | Kurn | |
| 2002/0112171 | A1 * | 8/2002 | Ginter | H04N 21/6581 375/E7.009 |
| 2003/0081790 | A1 * | 5/2003 | Kallahalla | H04L 9/088 380/281 |
| 2003/0091191 | A1 * | 5/2003 | Watanabe | G07F 7/1008 380/277 |
| 2011/0126023 | A1 * | 5/2011 | Wang | G06F 21/78 726/19 |
| 2012/0064828 | A1 * | 3/2012 | Khan | H04W 12/068 455/41.1 |
| 2013/0333009 | A1 * | 12/2013 | Mackler | H04L 63/08 726/7 |
| 2015/0245412 | A1 * | 8/2015 | Tyson | H04W 4/06 370/338 |
| 2016/0021066 | A1 * | 1/2016 | Parvathaneni | H04W 12/04 713/171 |
| 2016/0253510 | A1 * | 9/2016 | Lim | G06F 21/335 726/30 |
| 2016/0314462 | A1 | 10/2016 | Hong et al. | |
| 2017/0318008 | A1 * | 11/2017 | Mead | H04L 63/083 |
| 2020/0104833 | A1 * | 4/2020 | Rule | G06Q 20/4018 |
| 2020/0250672 | A1 * | 8/2020 | Rule | G06F 9/543 |
| 2020/0274871 | A1 * | 8/2020 | Parvathaneni | H04L 63/0876 |
| 2021/0135868 | A1 * | 5/2021 | Oosthuizen | H04L 9/0863 |
| 2022/0191181 | A1 * | 6/2022 | Jiang | H04L 63/0485 |

* cited by examiner

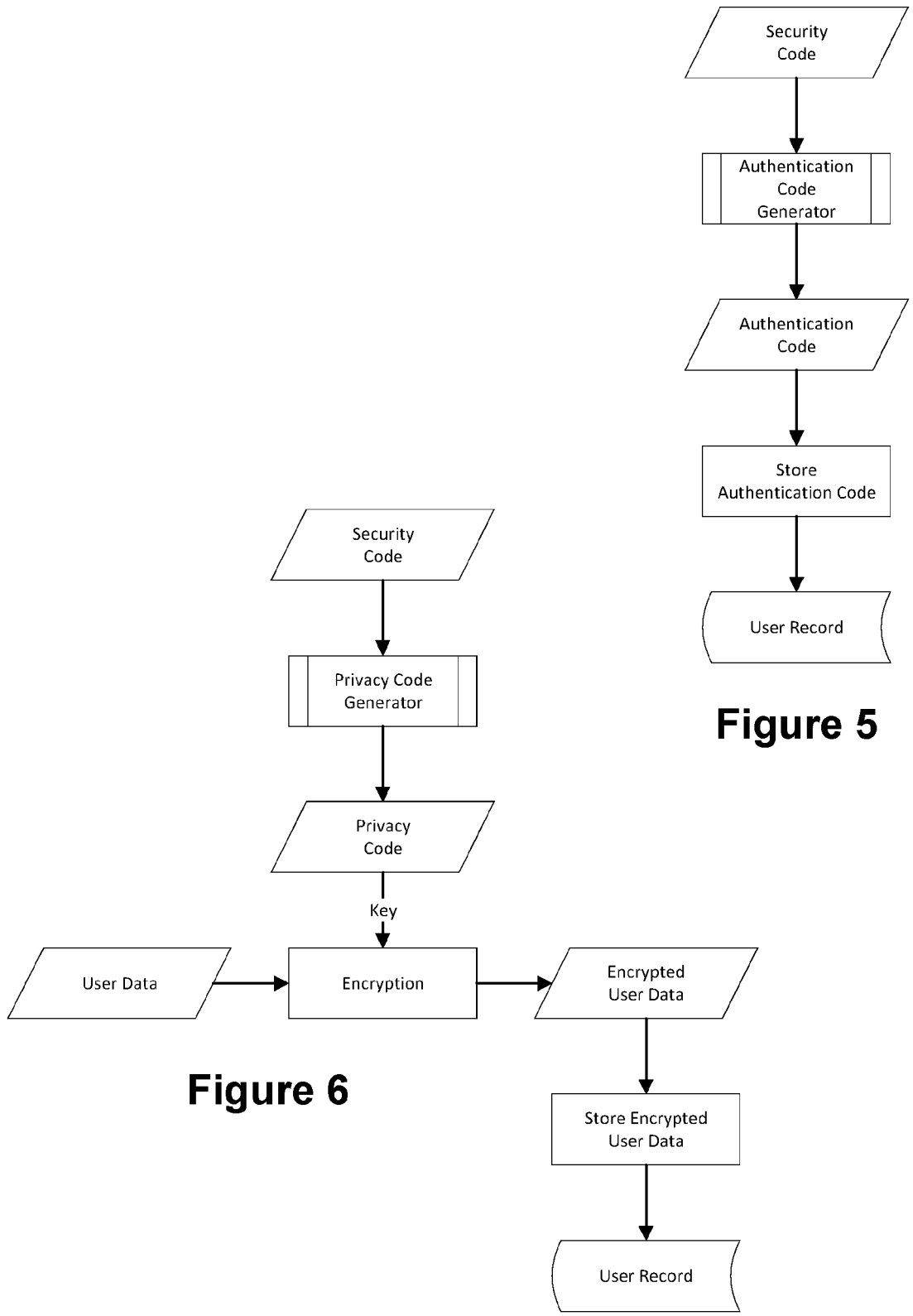

METHOD AND SYSTEM FOR A SECURE TRANSACTION

CROSS-REFERENCE TO RELATED APPLICATION

This present application is the US national phase of International Patent Application No. PCT/SG2020/050078, filed Feb. 14, 2020, which claims priority to Singapore Application No. 10201902395S, filed Mar. 18, 2019. The priority application, SG 10201902395S, is hereby incorporated by reference in its entirety.

FIELD OF THE INVENTION

The present invention herein relates to method and system for authenticating user, protecting user data and resetting security code.

BACKGROUND OF THE INVENTION

One neglected aspect of the enterprise data storage is sensitive user information security. The common approach used today is encryption of such user information such as social security number, credit card numbers, e-mails, etc. with a single key and storage of the resulting encrypted data in the database. Such solution prevents a malicious individual to access to the database and to make use of the user's sensitive data because it is encrypted.

Unfortunately, this approach provides a false sense of security in most cases. The problem is that the encryption key used to encrypt all records still needs to be stored somewhere in the system. For example, as soon as the system is required to send e-mail to the user or submit user's credit card number to the merchant account, the server(s) responsible for fulfilling that requirement must use the key to decrypt user information retrieved from the database. Chances are that if a malicious individual manages to get access to the database, which is usually the most protected part of the system, he will then be able to gain access to the aforementioned server. As soon as this happens, such malicious individual will be able to obtain the key and decrypt every database record encrypted with this key To overcome some of the above problems, U.S. Pat. Nos. 8,447,990 and 9,292,674 disclosing that a password encryption key (PEK) is generated from a user-supplied password, then used to encrypt the user's password. The encrypted password is stored in a user record on a server. At login, a would-be user's password is used to make a key, the key together with the would-be user's password is then transmitted to the platform. The key is then used to decrypt the stored encrypted user data which includes the registered password. The password transmitted is then compared to the decrypted registered password to complete the login process. The successful PEK is stored in a temporary session record and can be used to decrypt other sensitive user information previously encrypted and stored in the user record as well as to encrypt new information for storage in the user record. A public/private key system can also be used to maintain limited access for the host to certain information in the user record. A secure transaction process includes generating a key from a user-supplied unencrypted password or other identifying data, encrypting the user's password with the key, creating a user record and storing the encrypted password in the user record. In another aspect of the invention, upon user login, a key is made from a would-be user's password using the same algorithm used to generate the key from the originally supplied unencrypted password, then the encrypted password in the corresponding user record is retrieved and decrypted using the key and the decrypted password and the would-be user-supplied password are compared to see if they match. The key may be used to encrypt other sensitive user data, which can be stored in the user record. During a session in which a session record has been created, the key stored in the session record can be used to decrypt the other encrypted information stored in the user record for use in carrying out some desired action. However, the drawback of this system and method is that password and hash of the password to be used for decryption is still transmitted during transaction. Even though a malicious individual will not be able to immediately compromise each, and every user data encrypted by the PEK in the platform, the individual can still sniff the information such as the password and PEK in transit and make a targeted attack on individual users.

In view of the above shortcomings, the present invention herein aims to protect the data in transit to ensure a secure user authentication and user data protection both in transit and at rest.

SUMMARY OF THE INVENTION

The present invention provides a computer-implemented method for secure user authentication comprising creating a user record in a computer-implemented system; generating an authentication code from a supplied security code and storing the authentication code to the user record; upon user login, providing a login username by the user; generating a login authentication code from a login security code; using the login authentication code as encryption key to encrypt a transaction payload; transmitting the login username and the encrypted transaction payload to the computer-implemented system; retrieving the authentication code from the user record; providing the authentication code as the decryption key to decrypt the encrypted transaction payload; and if decryption is successful, then user is authenticated.

In another embodiment of the present invention, a computer-implemented method fora user data protection comprising creating a user record in a computer-implemented system; generating an authentication code from a supplied security code and encrypting a user data using a privacy code generated from the supplied security code; storing the authentication code and the encrypted user data to the user record; upon user login, providing a login username by the user; generating a login protection code and a login authentication code from a login security code; providing the login authentication code as encryption key to encrypt a transaction payload having the login protection code; transmitting the login username and the encrypted transaction payload to the computer-implemented system; retrieving the authentication code and the encrypted user data from the user record; providing the authentication code as a decryption key to decrypt the encrypted transaction payload; if decryption is successful, then the transaction payload is decrypted and retrieving the login protection code; generating a login privacy code from the login protection code; decrypting the encrypted user data using the login privacy code; after the transaction, encrypting the user data by the login privacy code; and storing the encrypted user data to the user record.

Another embodiment of the present invention, a computer-implemented method for verifying a user for resetting security code comprising creating a user record in a computer-implemented system; encrypting a reset payload using a verification code generated from a supplied user verification data and storing the encrypted reset payload to the user record; during security code resetting, generating a provided verification code from a provided user verification data; retrieving the encrypted reset payload from the user record; providing the provided verification code as a decryption key to decrypt the encrypted reset payload; if decryption is successful, then user is verified; requesting a new supplied security code from the user; generating a new authentication code from the new supplied security code and updating the new authentication code to the user record; and encrypting the reset payload with the provided verification code and storing the encrypted reset payload to the user record.

One of the advantages of the present invention is the encryption and decryption of the transaction payload to authenticate user and secure data in transit. Another advantage of the present invention is using a login privacy code, a code generated from a login protection code retrieved from the decrypted transaction payload that is transmitted, to decrypt the encrypted user data retrieved from the user record. This method and system provide secure user authentication and protect user data in the platform as well as during transmission to prevent threats such as man in the middle attack.

Further advantage of the present invention is a new method to reset or change a security code. Instead of storing and comparing user verification data such as security questions and answers, a verification code is generated from the supplied user verification data to encrypt a reset payload. During a reset or change of the security code, the code generated from a provided user verification data is used to decrypt the encrypted reset payload. If decryption is successful, then user is verified and security code reset is allowed.

Further advantages of the system in accordance with the invention and its application can be derived from the description and the accompanying drawings. The above-mentioned features and those to be further described below can be utilized in accordance with the invention individually or collectively in arbitrary combination. The embodiments mentioned are not to be considered exhaustive enumerations, rather have exemplary character. The invention is shown in the drawings and explained more closely with reference to embodiments.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates a flow chart for generating and storing an authentication code during registration in accordance of a system of the present invention.

FIG. 6 illustrates a flow chart for generating a privacy code to encrypt a user data during registration in accordance of a system of the present invention.

DETAILED DESCRIPTIONS OF THE INVENTION

Figure 1:
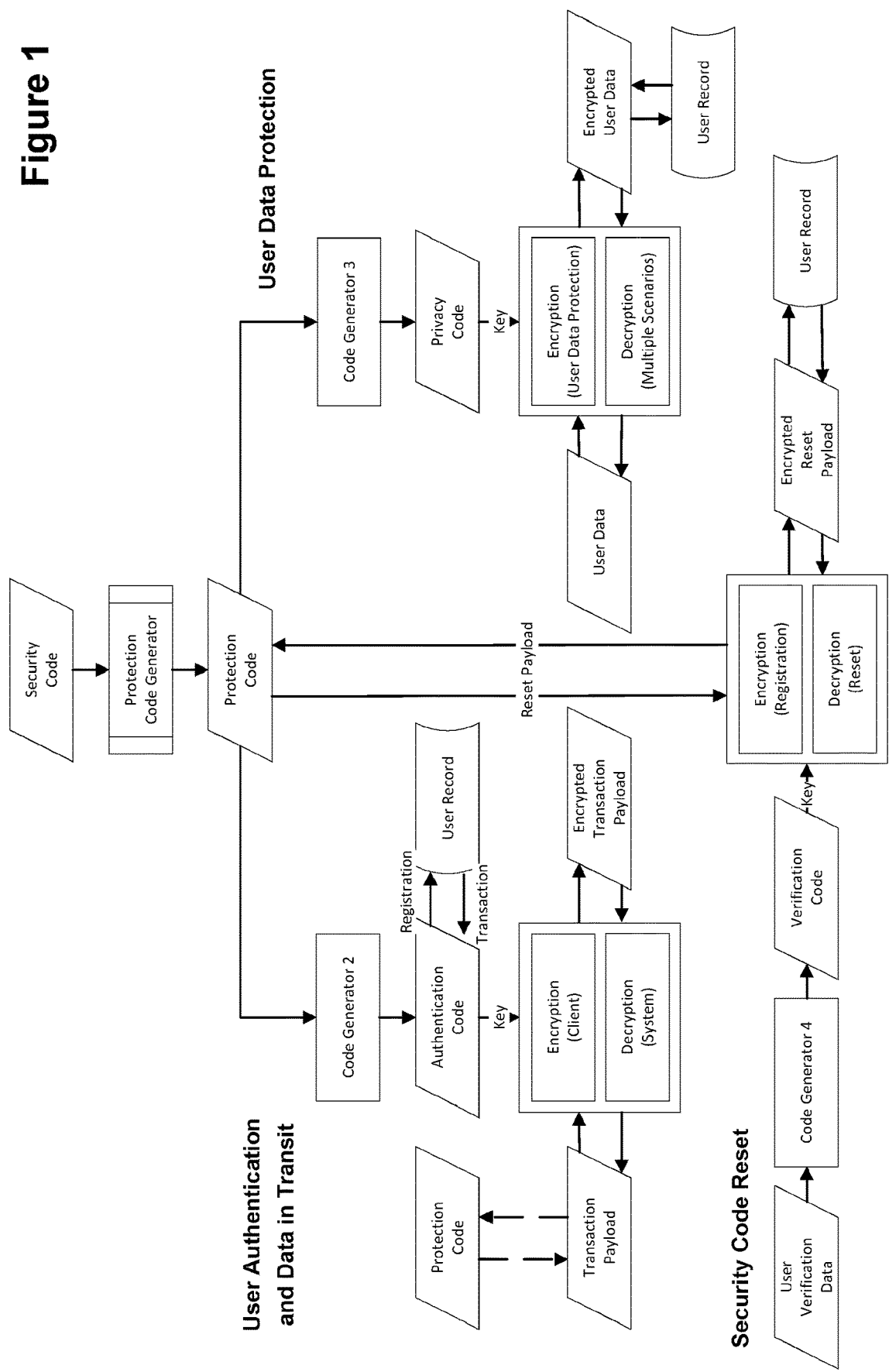
FIG. 1 illustrates a schematic diagram of securing data in transit, authenticating user, protecting user data and resetting security code of a system of the present invention.

The present invention will now be described in detail in connection with specific embodiments with reference to the accompanying drawings. Unless the context requires otherwise, throughout the specification and claims which follow, the word "comprise" and variations thereof, such as, "comprises" and "comprising" are to be construed in an open, inclusive sense that is as "including, but not limited to". Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The Applicants hereby give notice that new claims may be formulated to such features and/or combinations of such features during the prosecution of the present application or of any further application derived therefrom.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The term "security code" is used herein to refer to a code used to prove the identity of a user. It can be a code such as password, passcode that is supplied or generated such as user supplied, device, software or platform supplied or generated.

The term "code generator" is used herein to refer to a function or algorithm such as hashing and salting.

The term "protection code" is used herein to refer to a code that is either the security code or a code generated from the security code such as the hash of security code. It is used to generate authentication code for user authentication, privacy code for user data protection, and local access code for user authentication and user data protection in a local system.

The term "authentication code" is used herein to refer to a code that is used for user authentication.

The term "privacy code" is used herein to refer to a code that is used for user data protection.

The term "user verification data" is used herein to refer to the user data that is used to verify the user in the event of security code replacement or more importantly when the user forgets the security code. User verification data is a supplied information such as user's selected security questions and its corresponding answers.

The term "verification code" is used herein to refer to a code that is generated from the user verification data. Verification code is necessary during a security code reset or change.

The term "payload" is used herein to refer to transaction payload during transaction or reset payload during a security code reset.

The term "transaction payload" is used herein to refer to information to be encrypted during transaction such as the protection code to generate privacy code for user data protection, user location, user device information, transaction data such as payment account details.

The term "reset payload" is used herein to refer to the information to be encrypted or decrypted for the purpose of security code reset such as protection code.

The term "local access code" is used herein to refer to a code that is used for user authentication and user data protection in a local system.

FIG. 1 illustrates a schematic diagram of securing data in transit, authenticating user, protecting user data and resetting security code of a system of the present invention. Security code in the present invention is used to generate a protection code, which is then used to generate an authentication code for user authentication and a privacy code for user data protection. It is a common case that the user may forget or may need to replace the security code, thus user verification data is used to verify a user.

For user authentication and data in transit, an authentication code is generated and stored in the user record during registration from a protection code, generated from a supplied security code. Upon user login, user is requested to provide a login security code. The login security code is used to generate a login protection code and a login authentication code. The login authentication code is then used as encryption key to encrypt a transaction payload having the login protection code. The encrypted transaction payload is then transmitted to the computer-implemented system. The authentication code is then retrieved from the user record to decrypt the encrypted transaction payload. If the decryption is successful, then user is authenticated.

For user data protection, a user data is encrypted and stored during registration in the user record by a privacy code generated from the protection code. Upon user login, a login privacy code is generated from the login protection code retrieved from the decrypted transaction payload after the user is authenticated. The encrypted user data is then retrieved from the user record and decrypted by the login privacy code. After the transaction, the user data is to be encrypted and stored to the user record by the privacy code, either the login privacy code or a new privacy code generated from the login protection code.

For security code reset, a reset payload is encrypted and stored during registration in the user record by a verification code generated from a supplied user verification data. During resetting, a provided verification code is generated from a provided user verification data. The encrypted reset payload is then retrieved from the user record and decrypted by the provided verification code. If decryption is successful, then user is verified. A new authentication code is generated and updated to the user record from a new supplied security code. Subsequently, the reset payload can be the protection code to generate a reset privacy code. The reset privacy code is then used to decrypt the encrypted user data retrieved from the user record. Then, the user data is encrypted and updated to the user record by a new privacy code generated from the new supplied security code.

For user verification data change, the user is to be verified in the same way as security code reset. Then, a new verification code is generated from a new supplied user verification data. The reset payload is then encrypted and updated to the user record by the new verification code.

Figure 2:
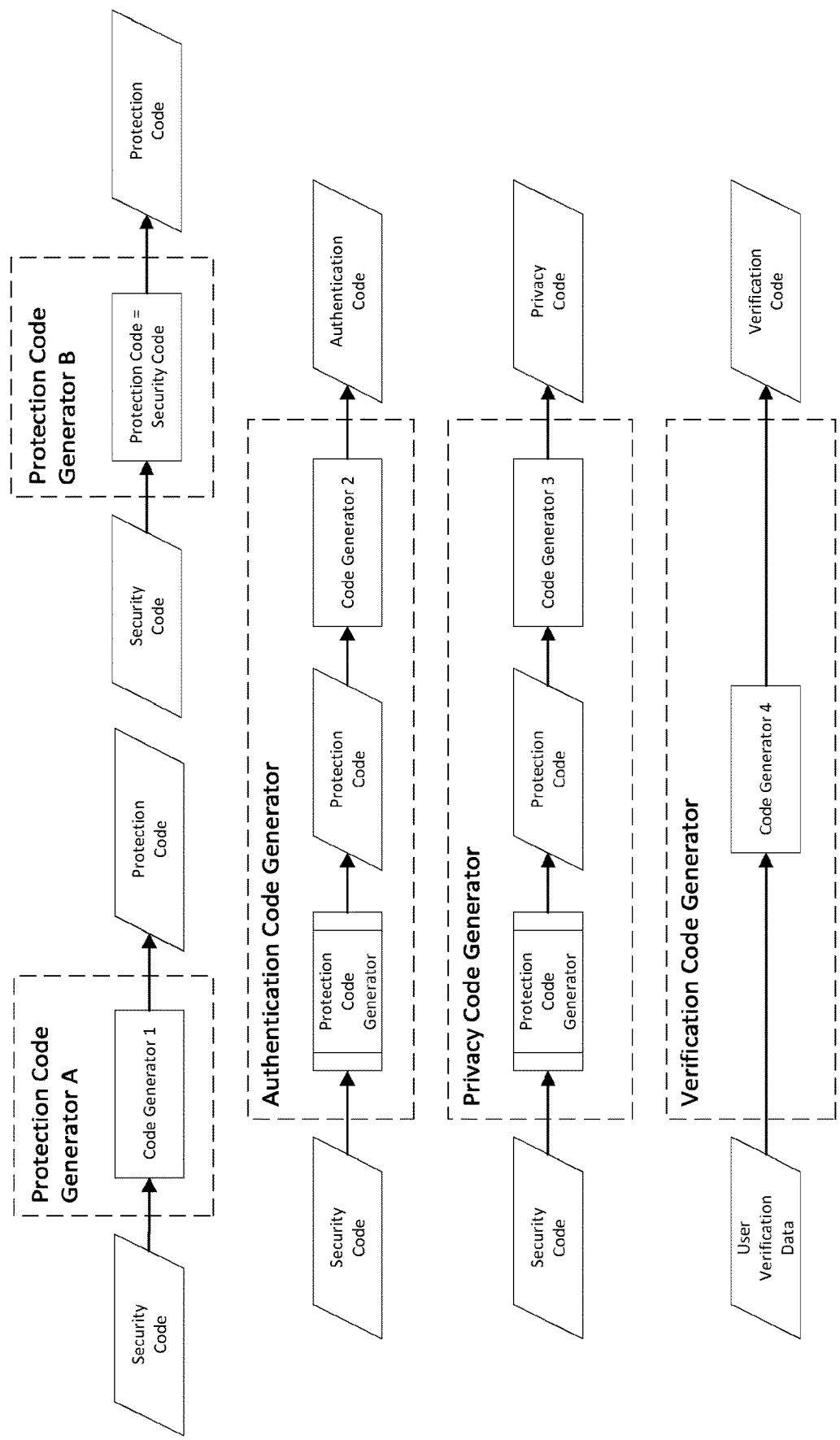
FIG. 2 illustrates the block diagrams of protection code generator, authentication code generator, privacy code generator and verification code generator in accordance of a system of the present invention.

FIG. 2 illustrates the block diagrams of protection code generator, authentication code generator, privacy code generator and verification code generator in accordance of a system of the present invention. A protection code generator is used to generate a protection code from a security code. The protection code is generated from the security code through a code generator, defined as code generator 1, as described in protection code generator A or the protection code is the security code as described in protection code generator B. An authentication code generator is used to generate an authentication code from the security code or the protection code. The protection code is generated from the security code through the protection code generator. Then, the authentication code is generated from the protection code through a code generator, defined as code generator 2. A privacy code generator is used to generate a privacy code from the security code or the protection code. The protection code is generated from the security code through the protection code generator. Then, the privacy code is generated from the protection code through a code generator, defined as code generator 3. A verification code generator is used to generate a verification code from a user verification data. The verification code is generated from the user verification data through a code generator, defined as code generator 4.

Figure 3:
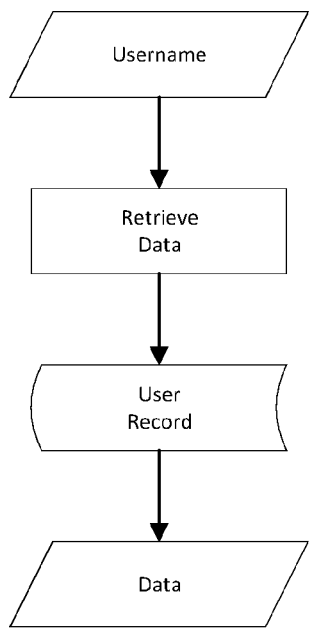
FIG. 3 illustrates a flow chart for retrieving data.

FIG. 3 illustrates a flow chart for retrieving data. Username provided by the user is used as reference to retrieve data such as authentication code, encrypted user data and encrypted reset payload from the user record of the system of the present invention.

User Authentication and Data in Transit in a Secure Online Transaction

Figure 4:
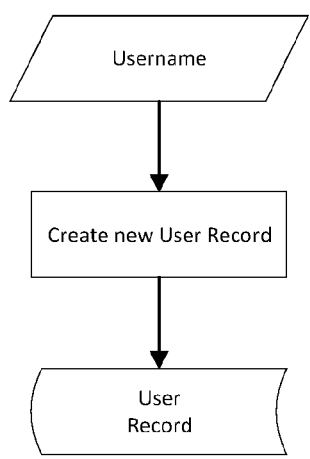
FIG. 4 illustrates a flow chart for creating a new user record.

During registration, user provides a username to the system of the present invention. Then, FIG. 4 illustrates a flow chart for creating a new user record. A user record is created with the username as reference. Subsequently, FIG. 5 illustrates a flow chart for generating and storing an authentication code during registration in accordance of a system of the present invention. An authentication code is generated from a supplied security code using the authentication code generator as described in FIG. 2. Then, the authentication code is stored in the user record.

Figure 8:
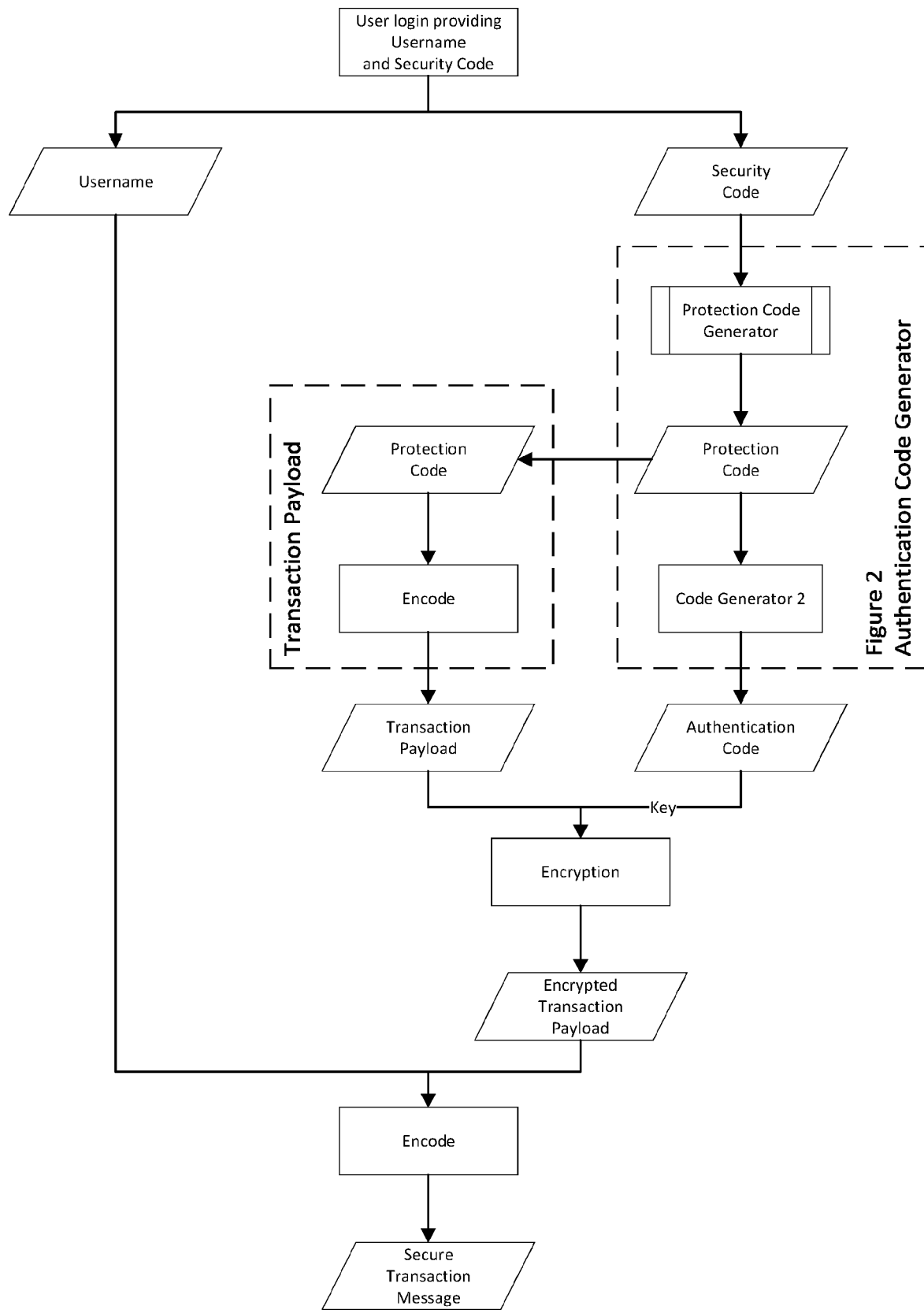
FIG. 8 illustrates a flow chart for encrypting a transaction payload for a secure online transaction in accordance of a system of the present invention.
Figure 9:
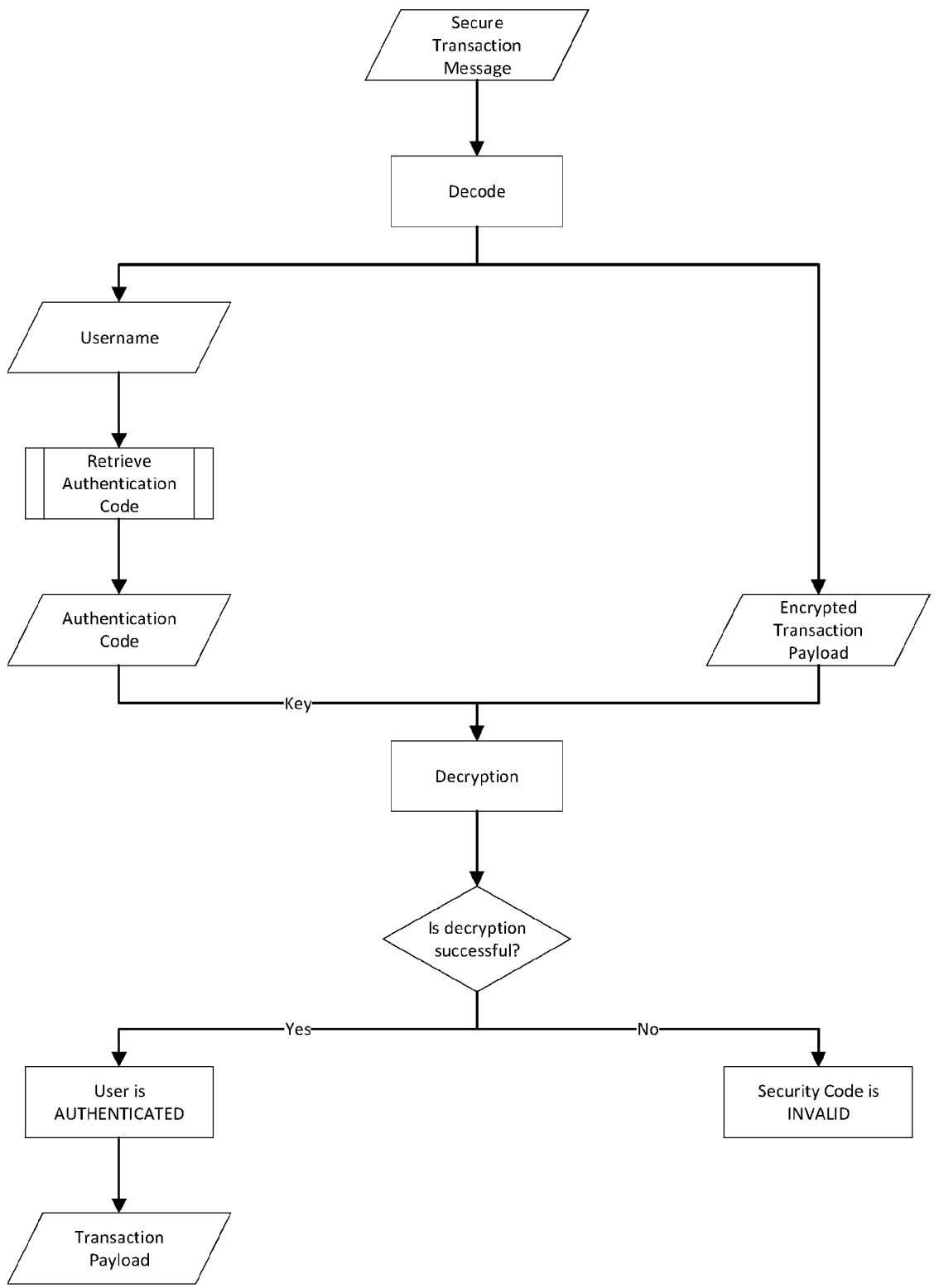
FIG. 9 illustrates a flow chart for authenticating a user in accordance of a system of the present invention.

FIG. 8 illustrates a flow chart for encrypting a transaction payload for a secure online transaction in accordance of a system of the present invention. Upon user login, user provides a login username and a login security code. A login authentication code is generated from the login security code using the authentication code generator described in FIG. 2. A transaction payload is encrypted by the login authentication code then encoded with the login username for transmission to the computer-implemented system. FIG. 9 illustrates a flow chart for authenticating a user in accordance of a system of the present invention. The authentication code is retrieved from the user record using the login username as described in FIG. 3 as a decryption key to decrypt the encrypted transaction payload. If decryption is successful, then user is authenticated, and the transaction payload is decrypted. Otherwise, the login security code is invalid.

User Data Protection in a Secure Online Transaction

During registration, a user record is created as described in FIG. 4. An authentication code is generated from a supplied security code and stored in the user record as described in FIG. 5. Subsequently, a flow chart for generating a privacy code to encrypt a user data during registration in accordance of a system of the present invention as illustrated in FIG. 6. A privacy code is generated from the supplied security code using the privacy code generator as described in FIG. 2. A user data is then encrypted by the privacy code and stored in the user record.

Figure 10:
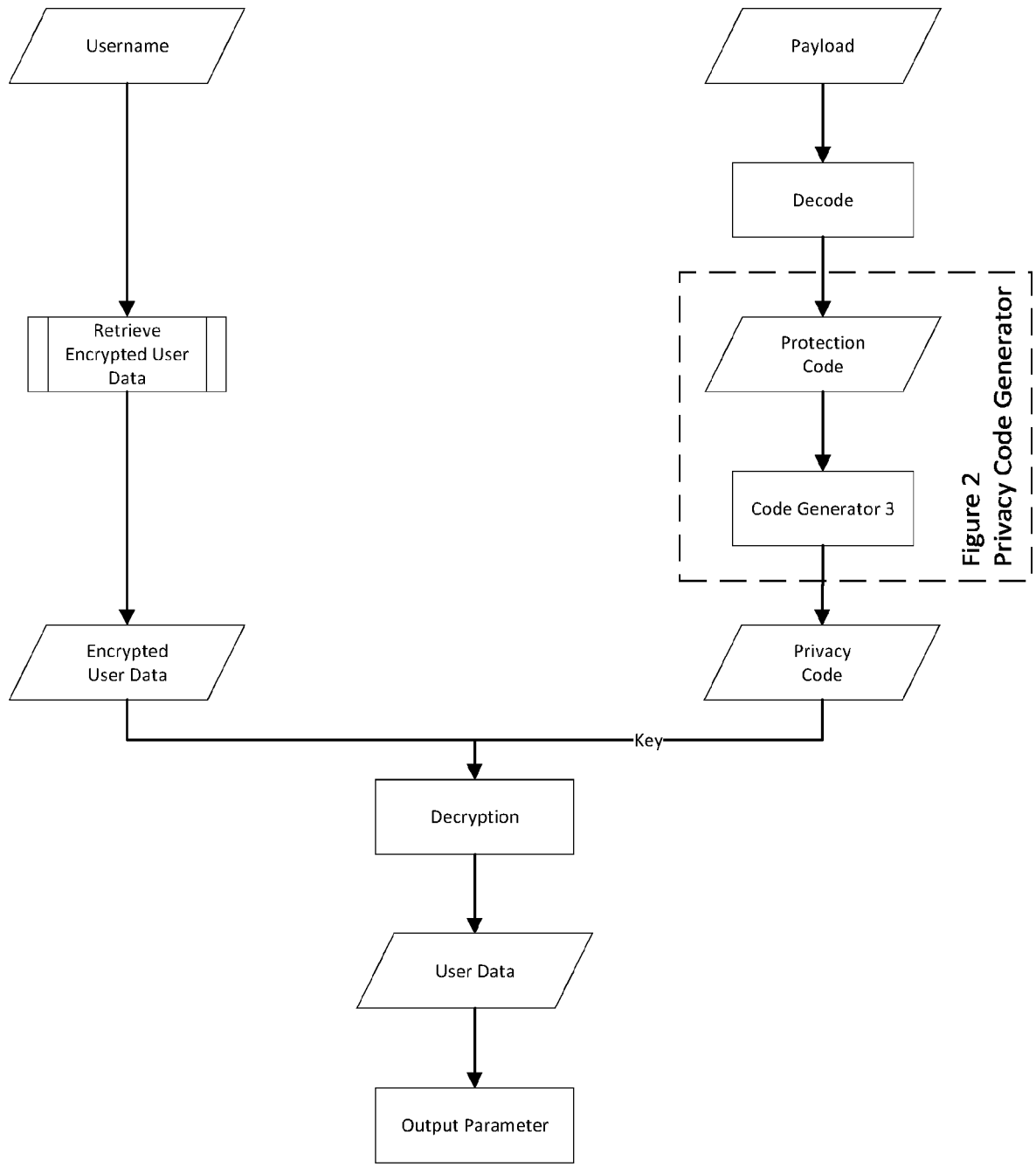
FIG. 10 illustrates a flow chart for decrypting the user data in accordance of a system of the present invention.

Upon user login, a login protection code is generated from a login security code then encoded into a transaction payload and securely transmitted with a login username to the computer-implemented system as described in FIG. 8. After the user is authenticated, the transaction payload is decrypted as described in FIG. 9. FIG. 10 illustrates a flow chart for decrypting the user data in accordance of a system of the present invention. Then, a login privacy code is generated from the login protection code decoded or retrieved from the transaction payload using the privacy code generator as described in FIG. 2. Subsequently, the login username is used to retrieve the encrypted user data from the user record as described in FIG. 3. The login privacy code is then used as decryption key to decrypt the encrypted user data. The user data is an output parameter.

Figure 11:
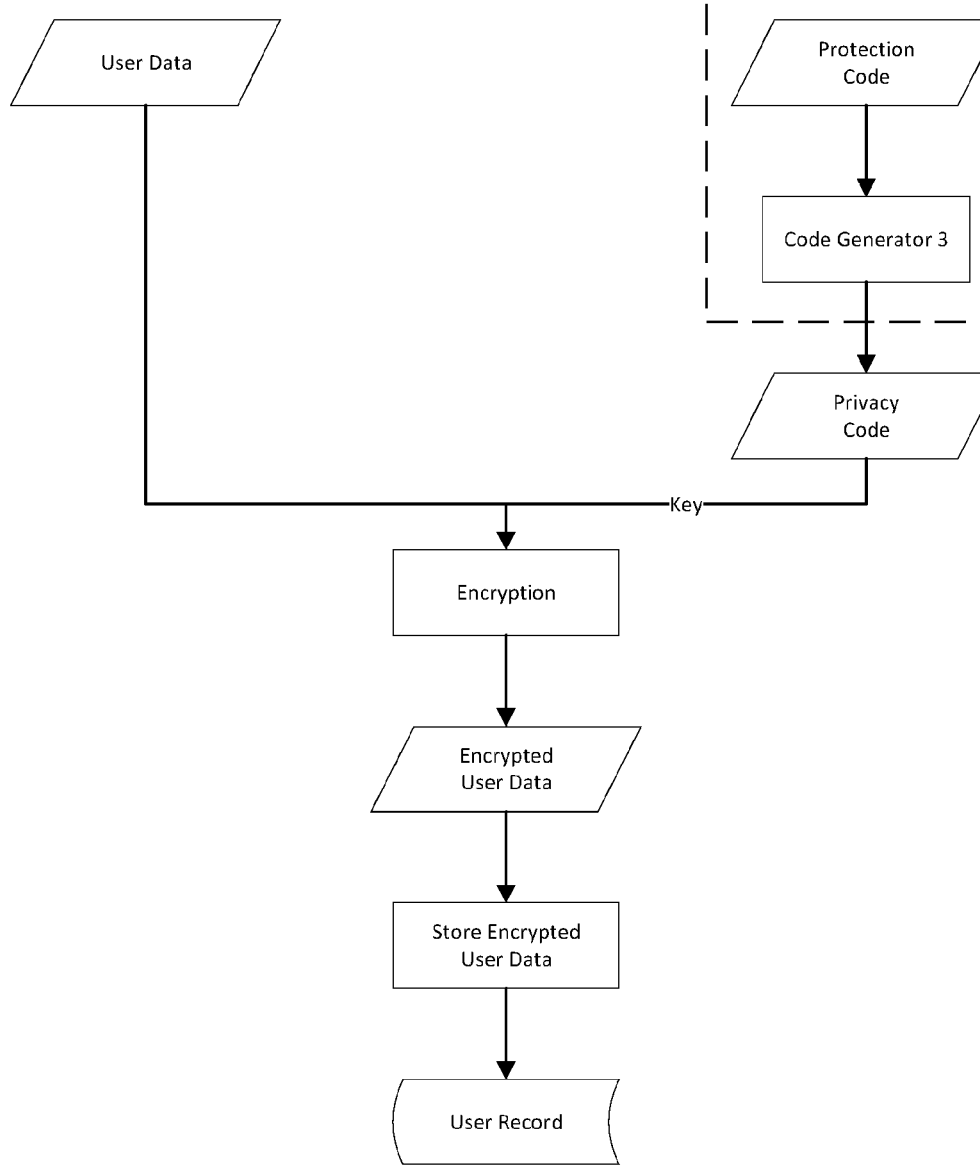
FIG. 11 illustrates a flow chart for encrypting the user data after a transaction in accordance of a system of the present invention.

After the transaction, a flow chart for encrypting the user data after a transaction in accordance of a system of the present invention as illustrated in FIG. 11. The login privacy code or optionally a new privacy code is generated as described in FIG. 2 from the login protection code. The privacy code is then used as encryption key to encrypt the user data, for example existing user data and new user data. Finally, the encrypted user data is stored in the user record.

Security Code Reset in a Secure Online Transaction

Figure 7:
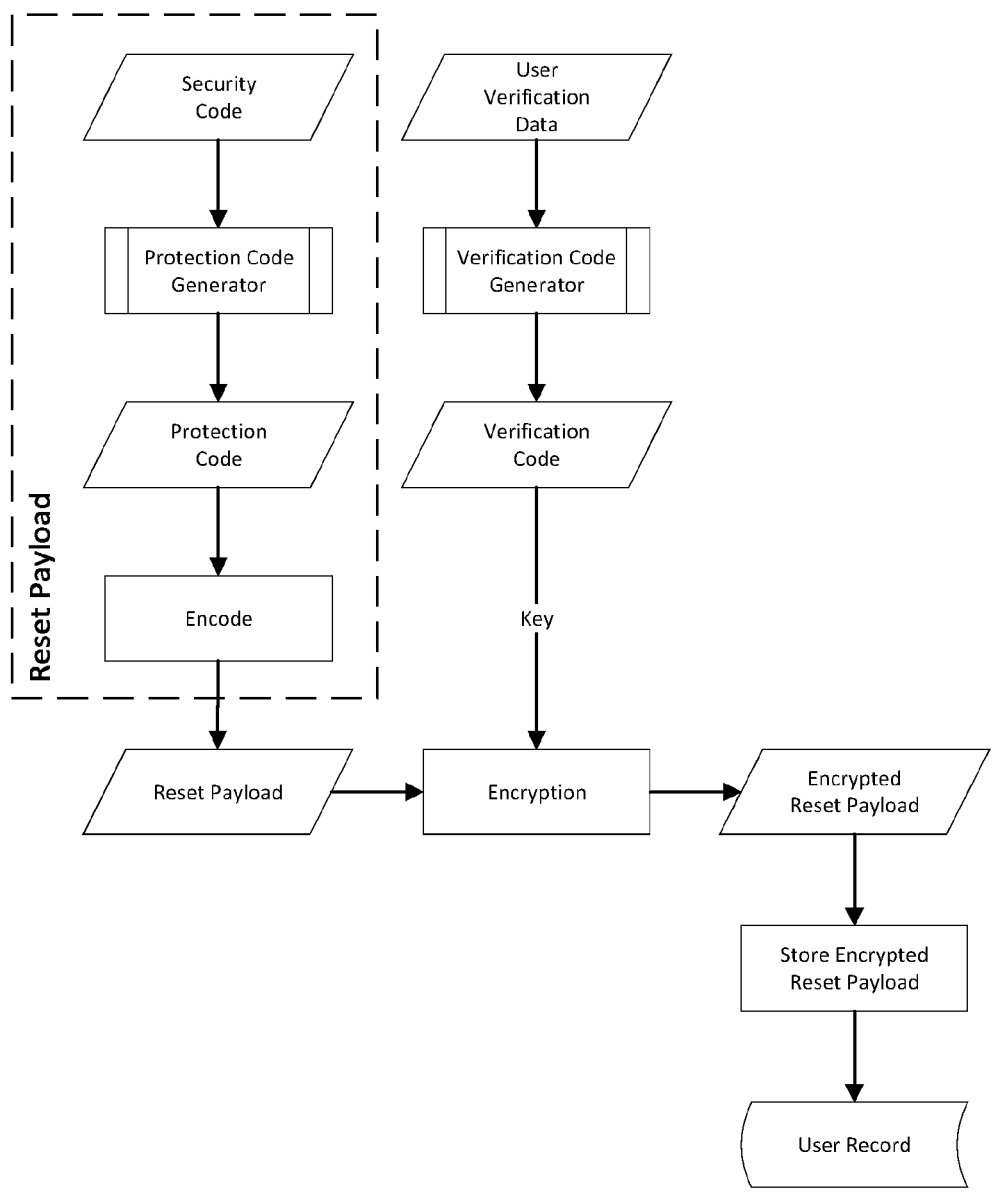
FIG. 7 illustrates a flow chart for generating a verification code to encrypt a reset payload during registration in accordance of a system of the present invention.

During registration, a user record is created as described in FIG. 4. Next, a flow chart for generating a verification code to encrypt a reset payload during registration in accordance of a system of the present invention as illustrated in FIG. 7. A verification code is generated from a supplied user verification data using the verification code generator described in FIG. 2. The verification code is then used as encryption key to encrypt a reset payload. The reset payload can be a protection code that is generated from a supplied security code as described in FIG. 2. Then, the encrypted reset payload is stored to the user record. Subsequently, a user data is encrypted and stored in the user record with a privacy code generated from the protection code as described in FIG. 6.

Figure 12:
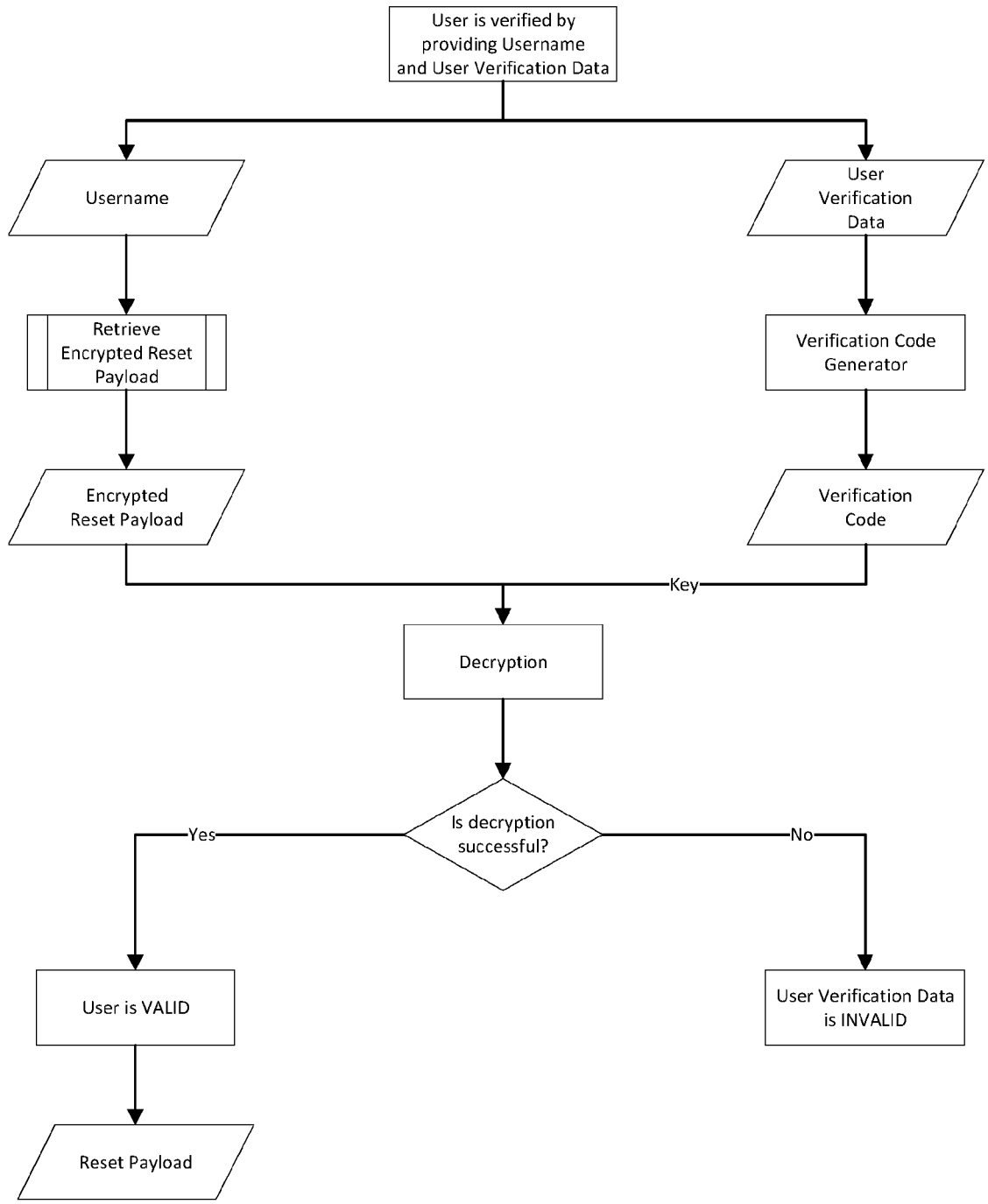
FIG. 12 illustrates a flow chart for validating a user through a user verification data in accordance of a system of the present invention.
Figure 13:
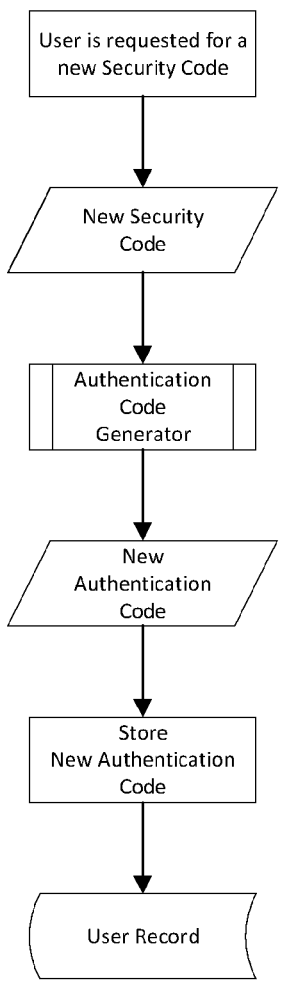
FIG. 13 illustrates a flow chart for generating and storing a new authentication code to complete a security code reset in accordance of a system of the present invention.

During a security code reset, a flow chart for validating a user through a user verification data in accordance of a system of the present invention as illustrated in FIG. 12. A provided verification code is generated from a provided user verification data using the verification code generator described in FIG. 2. Subsequently, the encrypted reset payload is retrieved from the user record as described in FIG. 3. The provided verification code is then used as decryption key to decrypt the encrypted reset payload. If decryption is successful, then user is verified and the reset payload is decrypted. Otherwise, the provided user verification data is invalid. After verifying the user, a flow chart for generating and storing new authentication code to complete security code reset in accordance of a system of the present invention. User is requested to provide a new supplied security code as shown in FIG. 13. A new authentication code is then generated and updated to the user record from the new supplied security code using the authentication code generator as described in FIG. 2.

Figure 14:
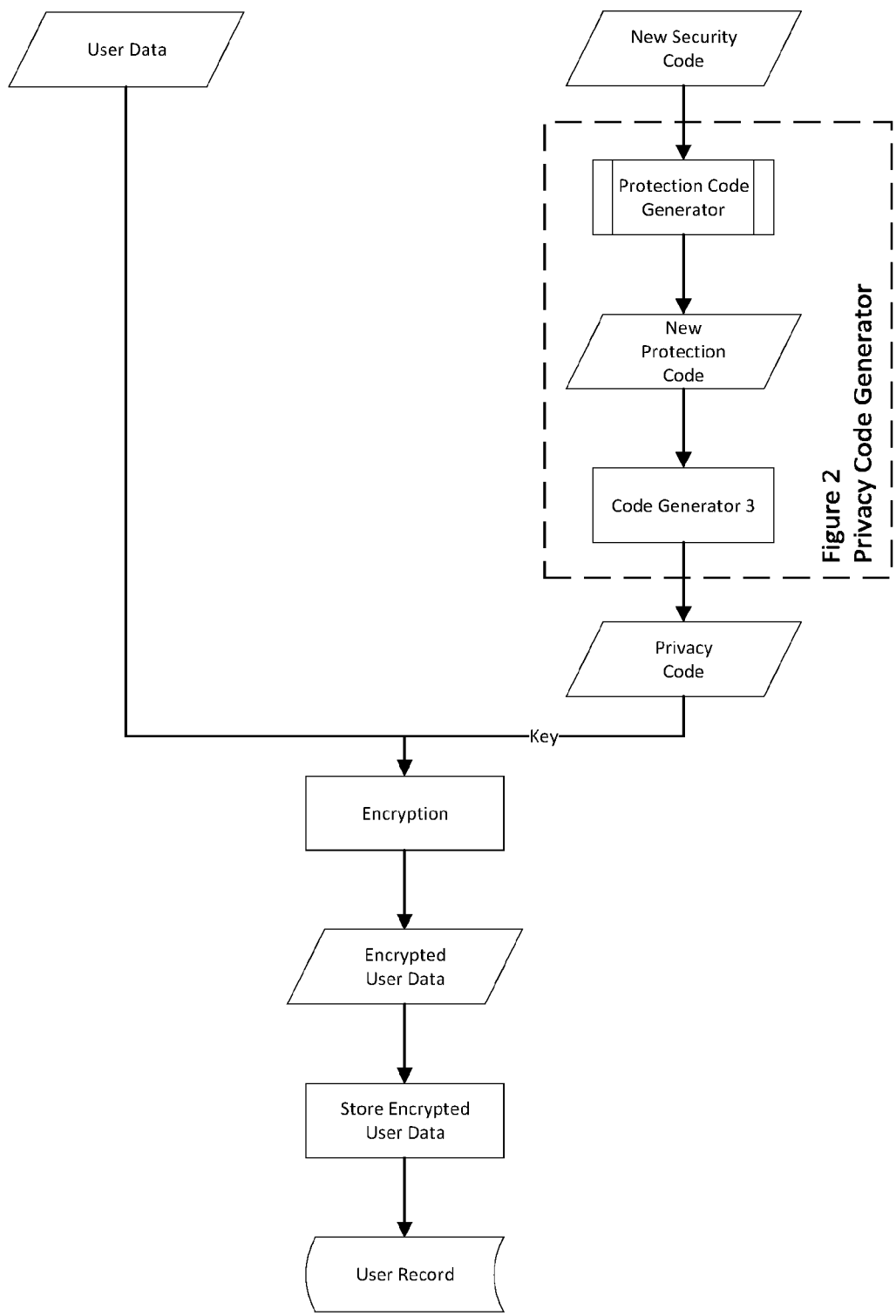
FIG. 14 illustrates a flow chart for encrypting the user data after a security code reset in accordance of a system of the present invention.

The protection code decoded or retrieved from the decrypted reset payload is then used to generate a reset privacy code that is used as decryption key to decrypt the encrypted user data retrieved from the user record as described in FIG. 10. Next, a flow chart for encrypting the user data after a security code reset in accordance of a system of the present invention as depicted in FIG. 14. A new privacy code is generated from the new supplied security code using the privacy code generator described in FIG. 2. Then, the user data is encrypted by the new privacy code and stored in the user record.

Figure 15:
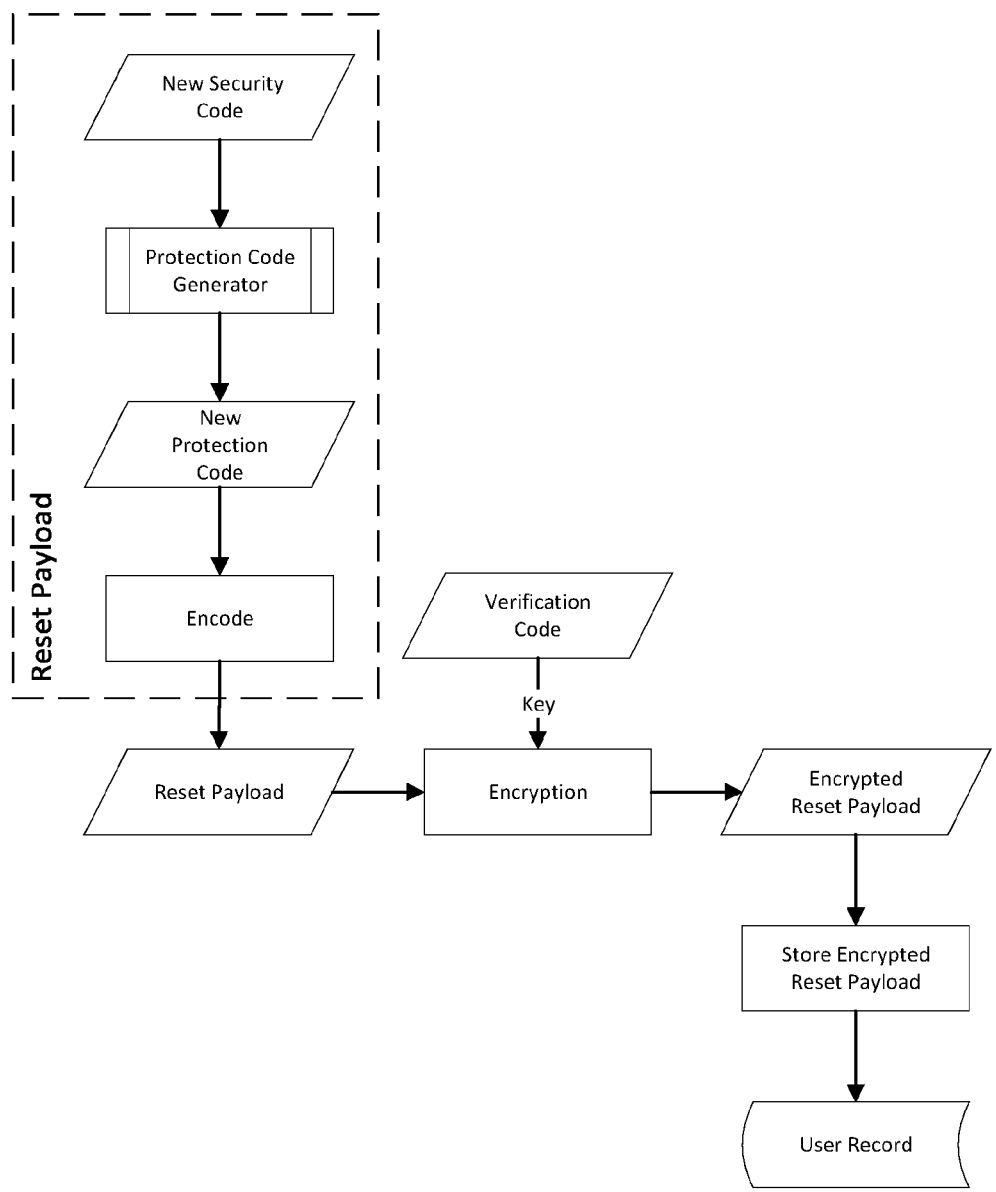
FIG. 15 illustrates a flow chart for encrypting the reset payload after a security code reset in accordance of a system of the present invention.

After the security code reset, a flow chart for encrypting the reset payload after a security code reset in accordance of a system of the present invention as illustrated in FIG. 15. The reset payload is encrypted by the provided verification code and updated to the user record. The reset payload can be a new protection code that is generated from the new supplied security code using the protection code generator as described in FIG. 2.

Local System

Figure 17:
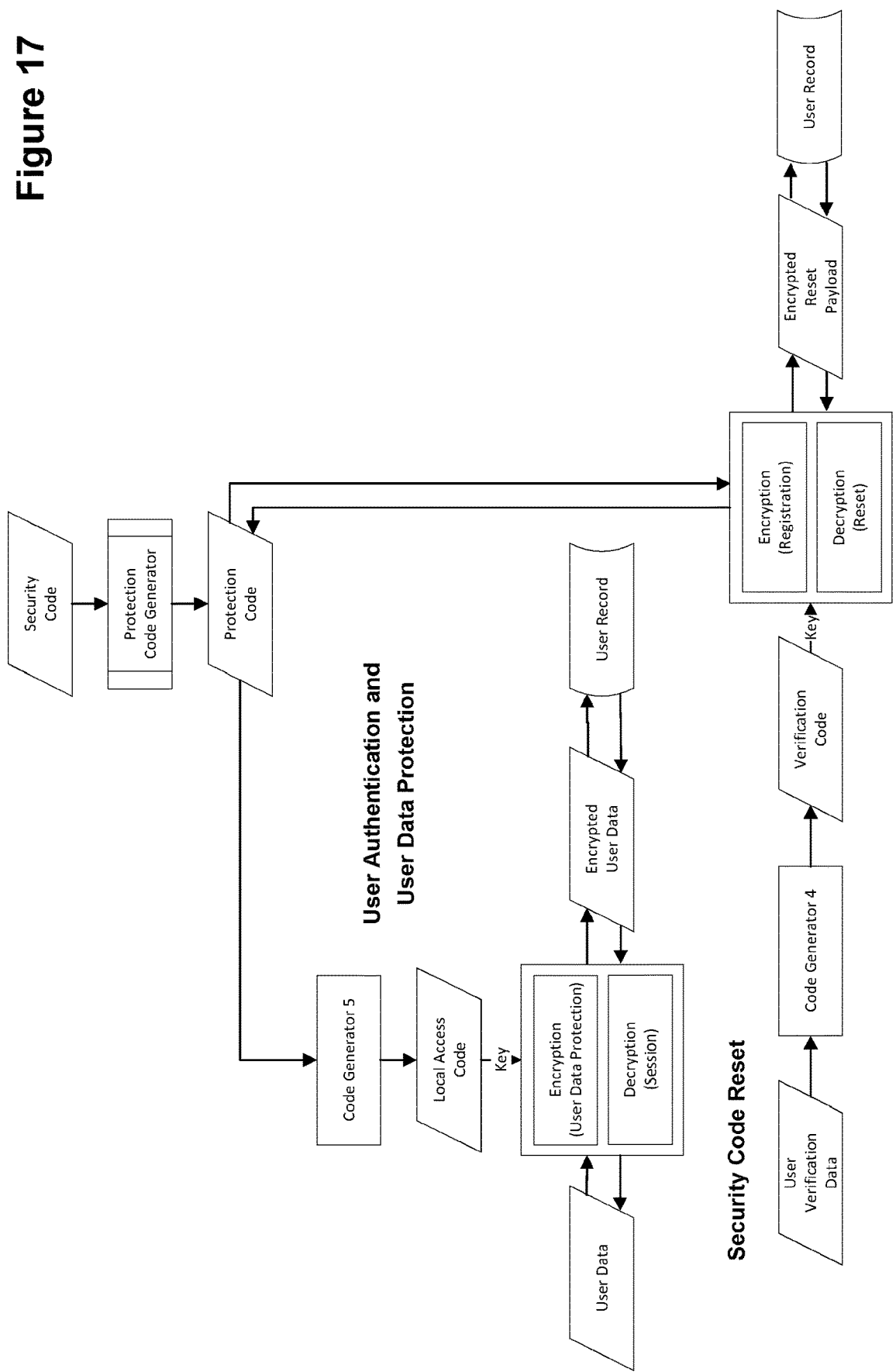
FIG. 17 illustrates a schematic diagram of authenticating user, protecting user data and resetting security code in a local system in accordance of a system of the present invention.

FIG. 17 illustrates a schematic diagram of authenticating user, protecting user data and resetting security code in a local system in accordance of a system of the present invention. In a local system, data is not transmitted to an external system for user authentication, user data protection and security code reset. Security code is used to generate a protection code, which is then used to generate a local access code for user authentication and user data protection. It is a common case that the user may forget or may need to replace the security code, thus user verification data is used to verify the user.

For user authentication and user data protection, a user data is encrypted and stored in the user record during registration by a local access code generated from a supplied security code. Upon user login, a login local access code is generated from a login security code. The encrypted user data is then retrieved from the user record and decrypted by the login local access code. If the decryption is successful, then user is authenticated and the user data is decrypted. After the session, the user data is encrypted and stored to the user record by the login local access code.

For security code reset, a reset payload is encrypted and stored during registration in the user record by a verification code generated from a supplied user verification data. During resetting, a provided verification code is generated from a provided user verification data. The encrypted reset payload is then retrieved from the user record and decrypted by the provided verification code. If decryption is successful, then user is verified and reset payload is decrypted. The reset payload can be the protection code to generate the local access code. The local access code is then used to decrypt the encrypted user data retrieved from the user record. Then, the user data is encrypted and updated to the user record by a new local access code generated from a new supplied security code.

For user verification data change, the user is verified in the same way as security code reset. Then, a new verification code is generated from a new supplied user verification data. The reset payload is then encrypted and updated to the user record by the new verification code.

User Authentication and User Data Protection in a Local System

Figure 18:
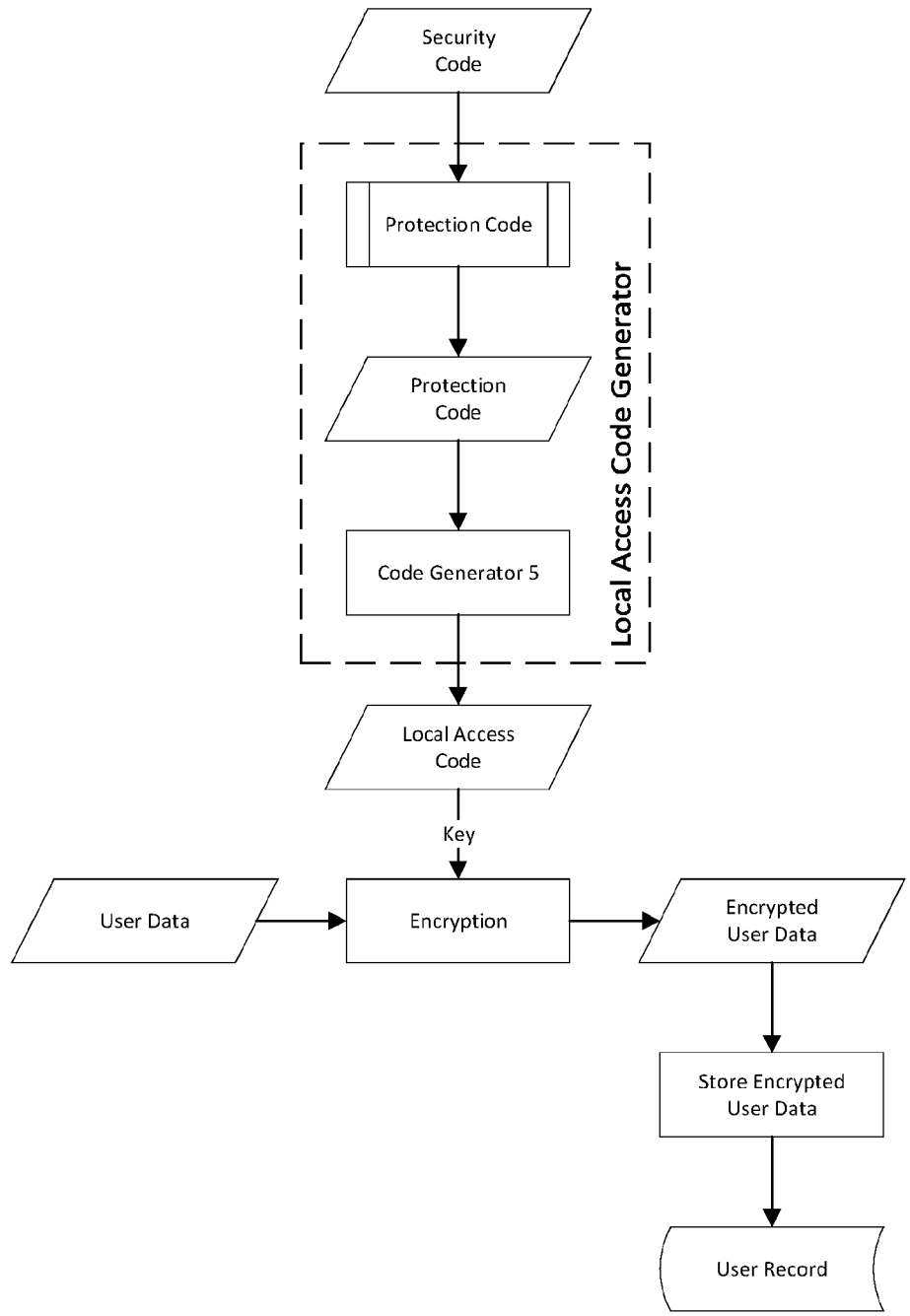
FIG. 18 illustrates a flow chart for generating a local access code to encrypt a user data during registration in a local system in accordance of a system of the present invention.

During registration, a user record is created as described in FIG. 4. Then, a flow chart for generating a local access code to encrypt a user data during registration in a local system in accordance of a system of the present invention as illustrated in FIG. 18. A local access code is generated from a supplied security code. The local access code is then used as encryption key to encrypt a user data. After which, the encrypted user data is stored in the user record.

Figure 19:
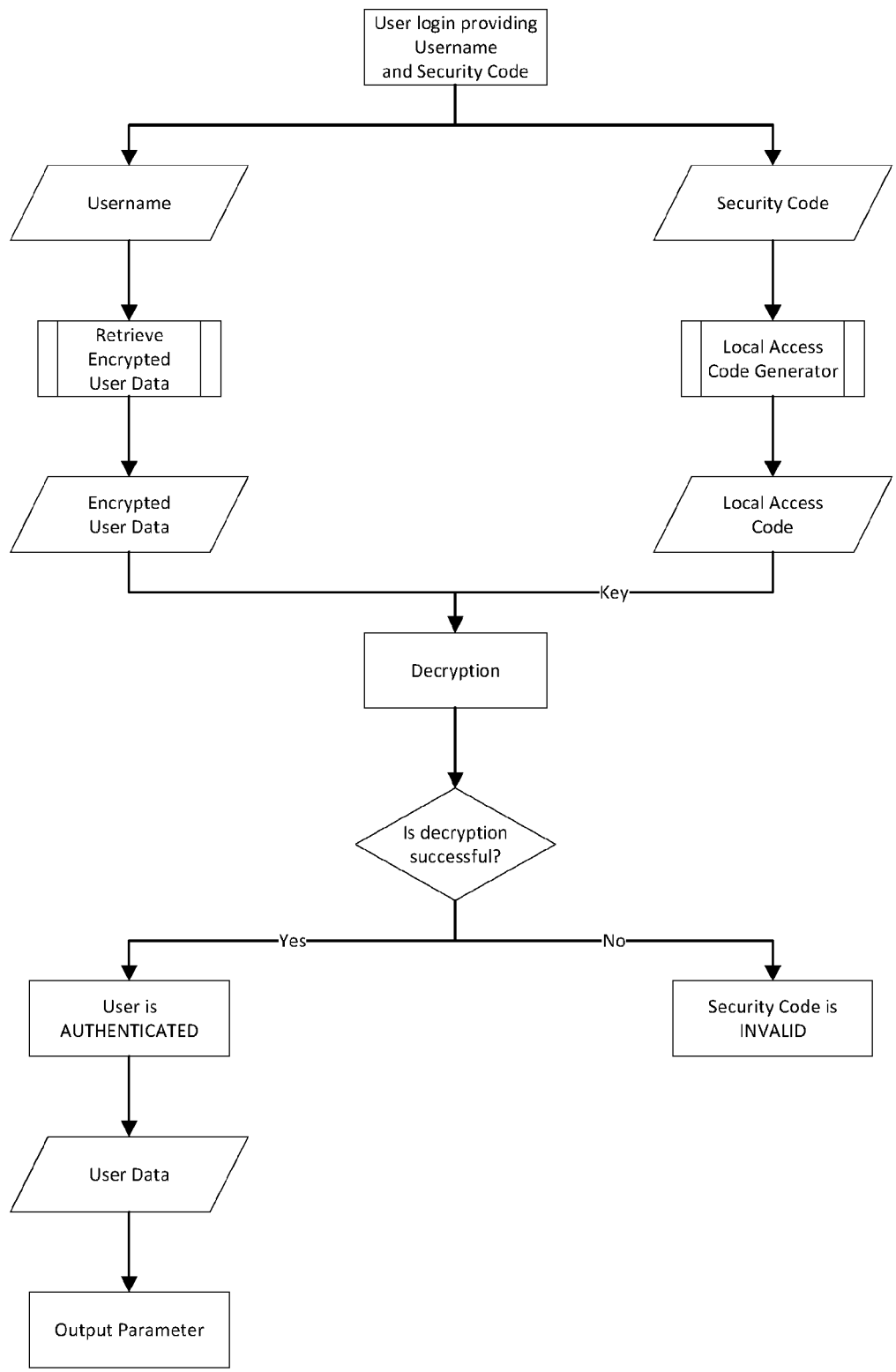
FIG. 19 illustrates a flow chart for authenticating a user and decrypting the user data in a local system in accordance of a system of the present invention.

Upon user login, a flow chart for authenticating a user and decrypting the user data in a local system in accordance of a system of the present invention as depicted in FIG. 19. A login username and a login security code are provided by the user. A login local access code is generated from the login security code using the local access code generator described in FIG. 18. Subsequently, the encrypted user data is retrieved as described in FIG. 3 from the user record using the login username. The login local access code is then used as decryption key to decrypt the encrypted user data. If decryption is successful, then user is authenticated and the user data is decrypted. Otherwise, the login security code is invalid.

Figure 20:
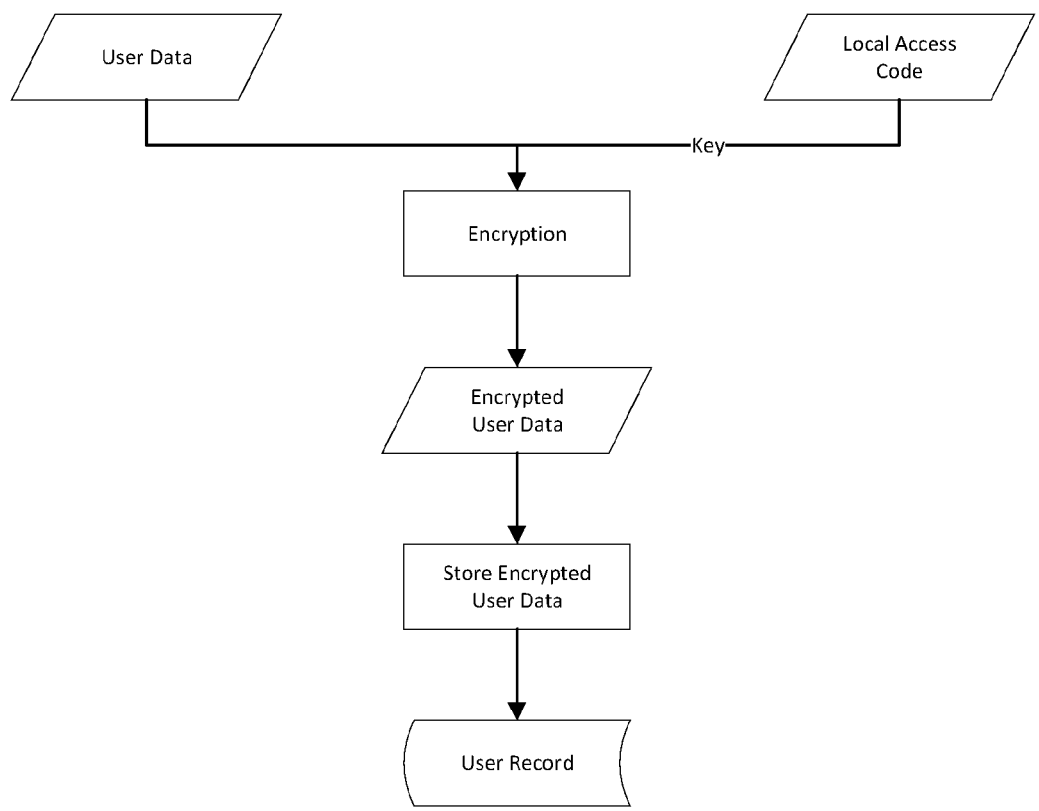
FIG. 20 illustrates a flow chart for encrypting the user data after a session in a local system in accordance of a system of the present invention.

After the session, the next step as shown in FIG. 20 with a flow chart for encrypting the user data after a session in a local system in accordance of a system of the present invention. The user data, for example existing user data and new user data, is encrypted by the login local access code then the encrypted user data is stored in the user record.

Security Code Reset in a Local System

Figure 21:
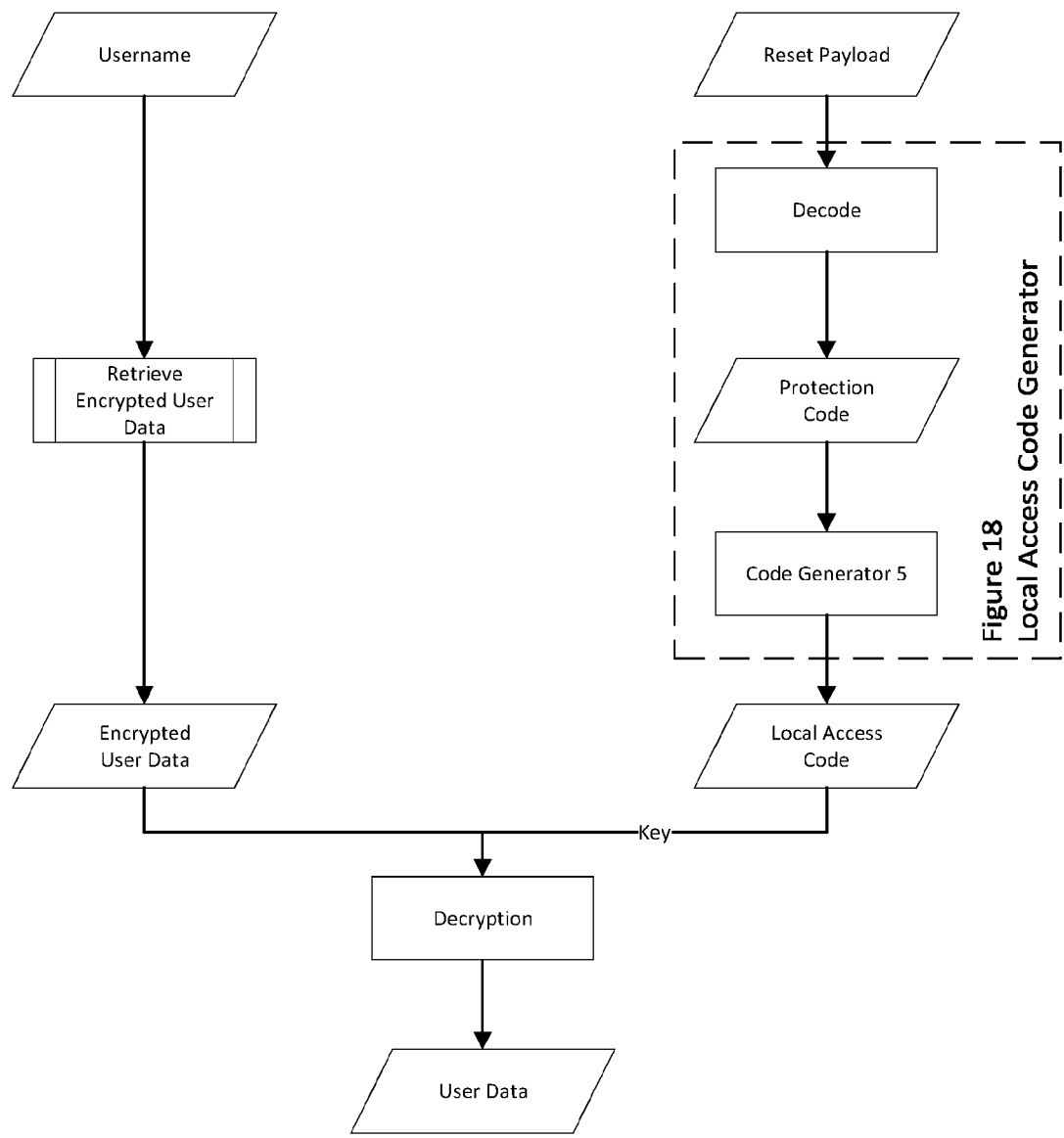
FIG. 21 illustrates a flow chart for decrypting the user data during a security code reset in a local system in accordance of a system of the present invention.
Figure 22:
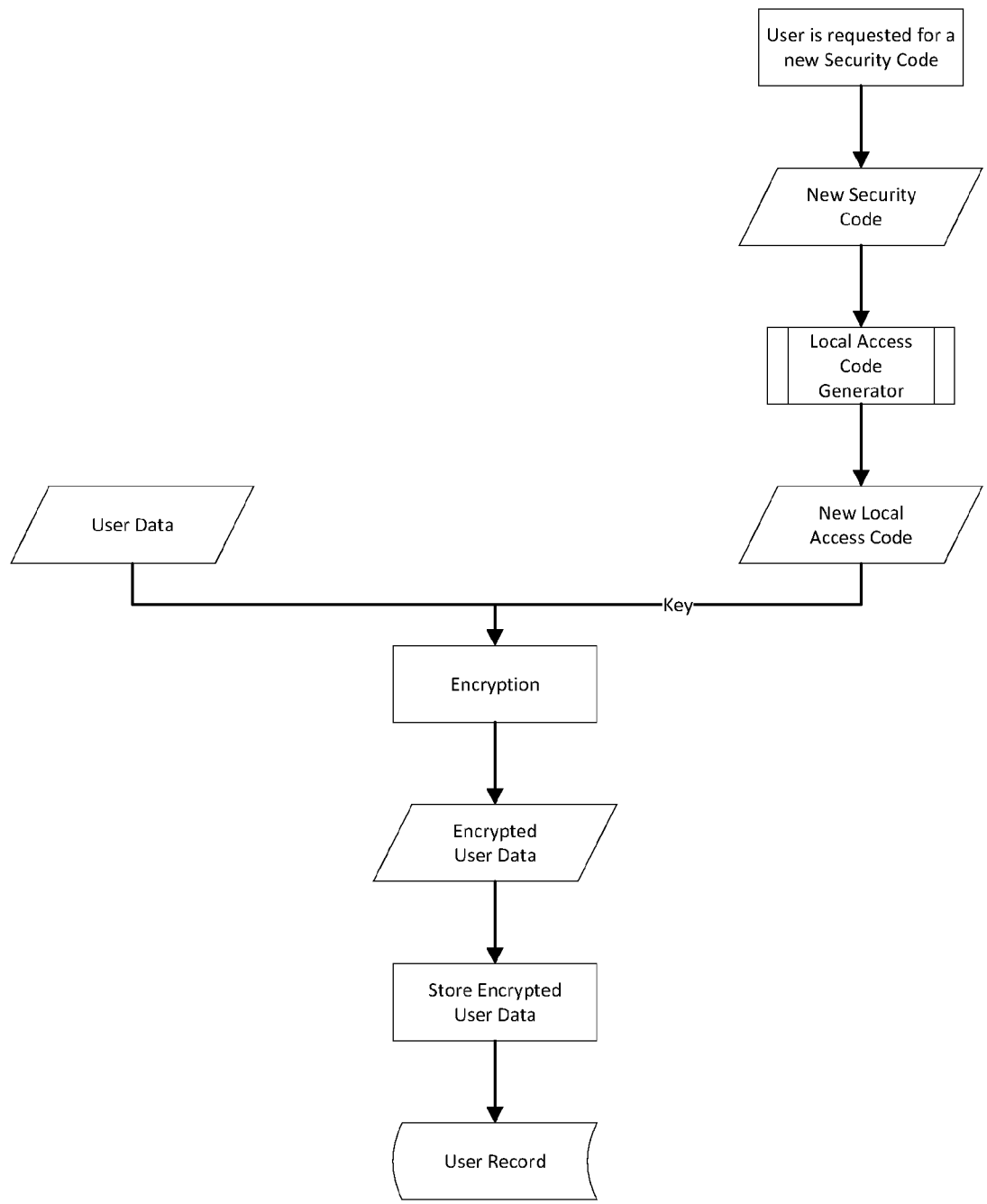
FIG. 22 illustrates a flow chart for encrypting the user data after a security code reset in a local system in accordance of a system of the present invention.

During registration, a user record is created as described in FIG. 4. Next, a reset payload is encrypted and stored in the user record by a verification code as described in FIG. 7. Meanwhile, a user data is encrypted and stored in the user record with a local access code generated from a protection code as described in FIG. 18. During a security code reset, user is verified and the reset payload is decrypted as described in FIG. 12. Then followed by a process for decrypting the user data during a security code reset in a local system in accordance of a system of the present invention as illustrated in FIG. 21. The protection code is decoded or retrieved from the decrypted reset payload. The reset local access code is then generated from the protection code using the local access code generator described in FIG. 18. Subsequently, the encrypted user data is retrieved from the user record as described in FIG. 3 using the provided username. The reset local access code is then used as decryption key to decrypt the encrypted user data. After which, a process for encrypting the user data after a security code reset in a local system in accordance of a system of the present invention in FIG. 22. User is asked to provide a new supplied security code. A new local access code is generated from the new supplied security code using the local access code generator described in FIG. 18. User data is then encrypted and stored in the user record by the new local access code. After the security code reset, the reset payload is encrypted and updated to the user record by the provided verification code as described in FIG. 15.

User Verification Data Change

Figure 16:
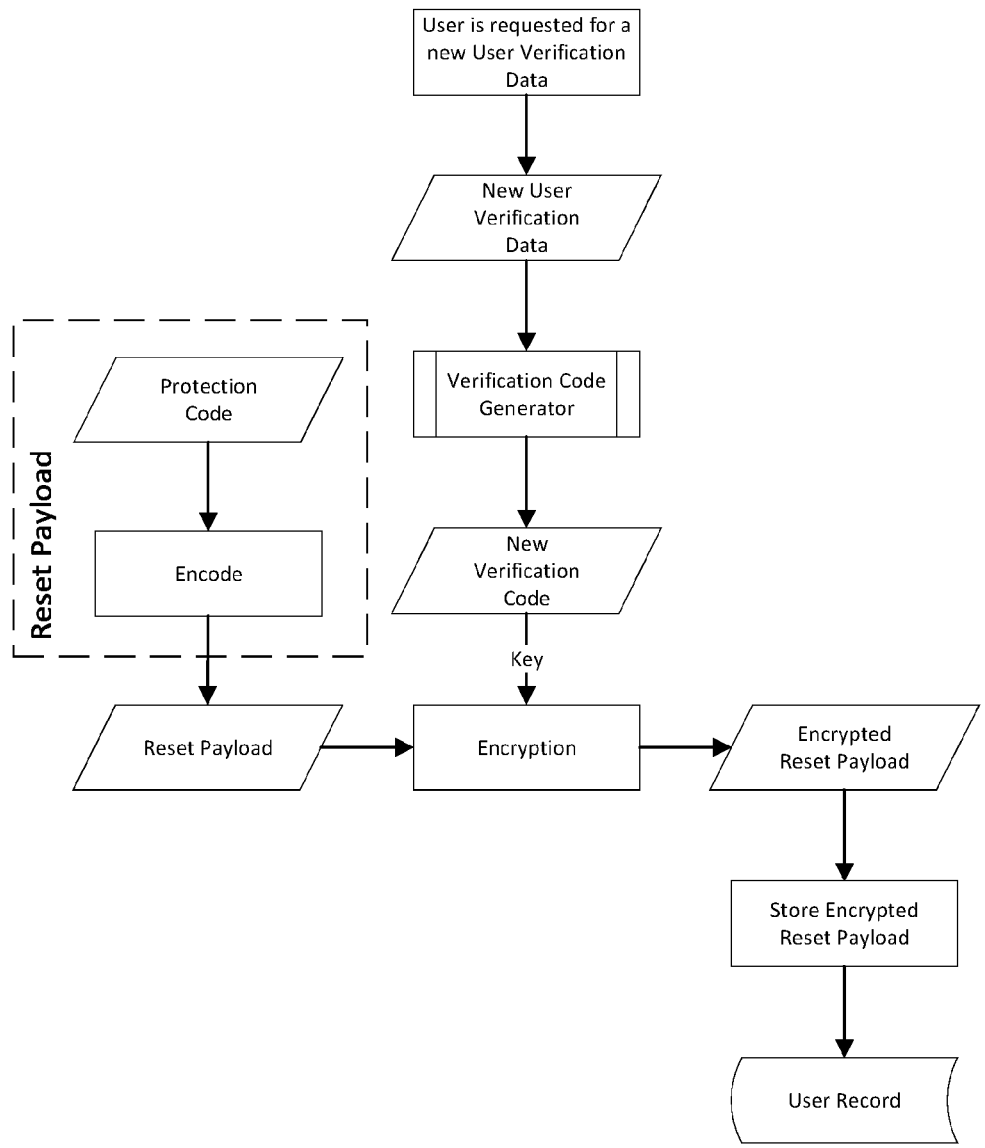
FIG. 16 illustrates a flow chart for encrypting the reset payload to complete a change of user verification data in accordance of a system of the present invention.

During registration, a user record is created as described in FIG. 4. Then, a reset payload is encrypted and stored in the user record by a verification code as described in FIG. 7. During a user verification data change, the encrypted reset payload is to be retrieved from the user record and decrypted by a provided verification code that is generated from a provided user verification data to verify the user as described in FIG. 12. This followed by a process for encrypting the reset payload to complete a change of user verification data in accordance of a system of the present invention as shown in FIG. 16. The user is asked to provide a new user verification data. A new verification code is then generated from the new supplied user verification data as described in FIG. 2 and used as encryption key to encrypt the reset payload. Finally, the encrypted reset payload is stored in the user record.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. The invention is thus to cover all modifications, equivalents, and alternatives falling within the spirit and scope of the following claims.

The foregoing detailed description and examples are merely illustrative of the preferred embodiments. They are by no means meant to be the exclusive description of the inventive concept hereby disclosed. It will be recognized by one of ordinary skill in the art that certain aspects of the practice of the invention are readily susceptible to modification or practice by alternative, known means.

The invention claimed is:

1. A computer-implemented method comprising:
 creating a user record in a computer-implemented system;
 generating an authentication code and a protection code from a supplied security code;
 encrypting a user data using a privacy code generated from the protection code;
 storing the authentication code and the encrypted user data to the user record;
 upon user login, providing a login username by the user and including a login protection code generated from a login security code to a transaction payload;
 generating a login authentication code from the login security code;
 encrypting the transaction payload using the login authentication code;
 transmitting the login username and the encrypted transaction payload to the computer-implemented system;
 retrieving the authentication code from the user record;
 decrypting the encrypted transaction payload using the authentication code; and if decryption is successful, then user is authenticated and the transaction payload is decrypted;
 upon successful decryption of the transaction payload, retrieving the login protection code from the decrypted transaction payload;
 generating a login privacy code from the login protection code; and
 decrypting the encrypted user data using the login privacy code.

2. The computer-implemented method of claim 1, further comprising:
 encrypting the user data using the login privacy code; and
 storing the encrypted user data to the user record.

3. The computer-implemented method of claim 1, further comprising:
 generating a new privacy code from the login protection code;
 encrypting the user data using the new privacy code; and
 storing the encrypted user data to the user record.

4. A computer-implemented method comprising:
 creating a user record in a computer-implemented system;
 generating a protection code from a supplied security code;
 encrypting a user data using a privacy code generated from the protection code;
 encrypting a reset payload using a verification code generated from a supplied user verification data, wherein the reset payload includes the protection code;
 storing the encrypted reset payload and the encrypted user data to the user record;
 during security code resetting, generating a provided verification code from a provided user verification data;
 retrieving the encrypted reset payload from the user record;
 decrypting the encrypted reset payload using the provided verification code; and if decryption is successful, then user is verified and the encrypted reset payload is decrypted;
 upon successful decryption of the reset payload, retrieving the protection code from the decrypted reset payload;
 generating a reset privacy code from the protection code; and
 decrypting the encrypted user data using the reset privacy code.

5. The computer-implemented method of claim 4, further comprising:
 requesting a new supplied user verification data from the user;
 generating a new verification code from the new supplied user verification data;
 encrypting the reset payload using the new verification code; and
 storing the encrypted reset payload to the user record.

6. The computer-implemented method of claim 4, further comprising:
    requesting a new supplied security code from the user;
    generating a new protection code, a new authentication code and a new privacy code from the new supplied security code;
    encrypting the new protection code using the provided verification code and encrypting the user data using the new privacy code; and
    storing the encrypted protection code, the new authentication code and the encrypted user data to the user record.

7. A system comprising: at least one processor; and memory coupled to said processor to carry out the steps of:
    creating a user record in a computer-implemented system;
    generating an authentication code and a protection code from a supplied security code;
    encrypting a user data using a privacy code generated from the protection code;
    storing the authentication code and the encrypted user data to the user record;
    upon user login, providing a login username by the user and including a login protection code generated from a login security code to a transaction payload;
    generating a login authentication code from the login security code;
    encrypting the transaction payload using the login authentication code;
    transmitting the login username and the encrypted transaction payload to the computer-implemented system;
    retrieving the authentication code from the user record;
    decrypting the encrypted transaction payload using the authentication code; and if decryption is successful, then user is authenticated and the transaction payload is decrypted;
    upon successful decryption of the transaction payload, retrieving the login protection code from the decrypted transaction payload;
    generating a login privacy code from the login protection code; and
    decrypting the encrypted user data using the login privacy code.

8. The system of claim 7 to further carry out the steps of:
    encrypting the user data using the login privacy code; and
    storing the encrypted user data to the user record.

9. The system of claim 7 to further carry out the steps of:
    generating a new privacy code from the login protection code;
    encrypting the user data using the new privacy code; and
    storing the encrypted user data to the user record.

10. A system comprising: at least one processor; and memory coupled to said processor to carry out the steps of:
    creating a user record in a computer-implemented system;
    generating a protection code from a supplied security code;
    encrypting a user data using a privacy code generated from the protection code;
    encrypting a reset payload using a verification code generated from a supplied user verification data, wherein the reset payload includes the protection code;
    storing the encrypted reset payload and the encrypted user data to the user record;
    during security code resetting, generating a provided verification code from a provided user verification data;
    retrieving the encrypted reset payload from the user record;
    decrypting the encrypted reset payload using the provided verification code; and if decryption is successful, then user is verified and the encrypted reset payload is decrypted;
    upon successful decryption of the reset payload, retrieving the protection code from the decrypted reset payload;
    generating a reset privacy code from the protection code; and
    decrypting the encrypted user data using the reset privacy code.

11. The system of claim 10 to further carry out the steps of:
    requesting a new user verification data from the user;
    generating a new verification code from supplied new user verification data;
    encrypting the reset payload using the new verification code; and
    storing the encrypted reset payload to the user record.

12. The system of claim 10 to further carry out the steps of:
    requesting a new supplied security code from the user;
    generating a new protection code, a new authentication code and a new privacy code from the new supplied security code;
    encrypting the new protection code using the provided verification code and encrypting the user data using the new privacy code; and
    storing the encrypted protection code, the new authentication code and the encrypted user data to the user record.

13. A computer-executable program stored on a non-transitory computer readable medium, comprising instructions for:
    creating a user record in a computer-implemented system;
    generating a protection code from a supplied security code;
    encrypting a user data using a local access code generated from the protection code;
    storing the encrypted user data to the user record;
    encrypting a reset payload using a verification code generated from a supplied user verification data, wherein the reset payload includes the protection code;
    storing the encrypted reset payload to the user record;
    during security code resetting, generating a provided verification code from a provided user verification data;
    retrieving the encrypted reset payload from the user record;
    decrypting the encrypted reset payload using the provided verification code; and
    if decryption is successful, then user is verified and the encrypted reset payload is decrypted;
    upon successful decryption of the reset payload, retrieving the protection code from the decrypted reset payload;
    generating a reset local access code from the protection code; and
    decrypting the encrypted user data using the reset local access code.

14. The computer-executable program stored on a non-transitory computer readable medium of claim 13, further comprising instructions for:
    requesting a new user verification data from the user;
    generating a new verification code from supplied new user verification data;

encrypting the reset payload using the new verification code; and storing the encrypted reset payload to the user record.

15. The computer-executable program stored on a non-transitory computer readable medium of claim 13, further comprising instructions for:

requesting a new security code from the user;

generating a new protection code and a new local access code from the new security code;

encrypting the new protection code using the provided verification code and encrypting the user data using the new local access code; and storing the encrypted protection code and the encrypted user data to the user record.

16. The computer-executable program stored on a non-transitory computer readable medium of claim 15, further comprising instructions for:

wherein, generating a login local access code from a login security code upon user login; and decrypting the encrypted user data using the login local access code.

\* \* \* \* \*